March 7, 1933. G. H. ISLEY 1,900,397
OPERATION OF REGENERATIVE FURNACES
Filed March 12, 1931.
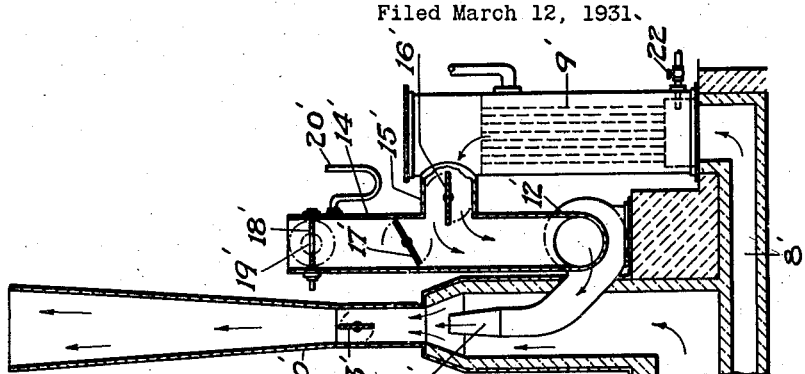
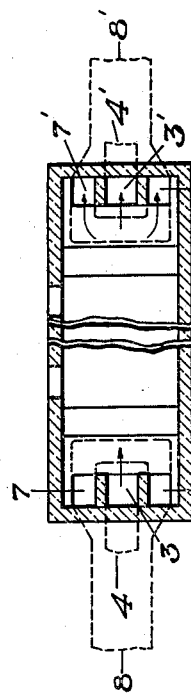
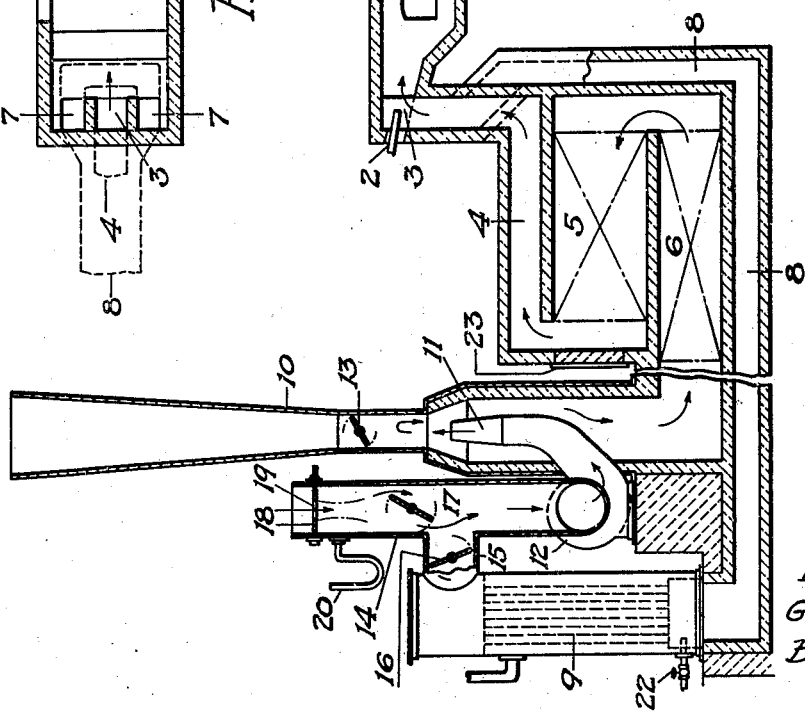
Inventor
George H. Isley.
By Geo. H. Kennedy
Attorney.

Patented Mar. 7, 1933

1,900,397

UNITED STATES PATENT OFFICE

GEORGE H. ISLEY, OF WORCESTER, MASSACHUSETTS, ASSIGNOR TO MORGAN CONSTRUCTION COMPANY, OF WORCESTER, MASSACHUSETTS, A CORPORATION OF MASSACHUSETTS

OPERATION OF REGENERATIVE FURNACES

Application filed March 12, 1931. Serial No. 521,974.

The present invention relates in general to regenerative furnaces. In particular, the invention provides for the more efficient operation and control of such furnaces, by quantitative determination of the air supplied for combustion within the furnace, and by the highly advantageous utilization, in a steam boiler or the like, of the heat contained in the outgoing products of combustion.
Other and further objects of the invention will be apparent from the following detailed description thereof, reference in this connection being had to the accompanying drawing, in which—
Fig. 1 is a schematic sectional view of a regenerative furnace and associated apparatus involving my invention.

Fig. 2 is a fragmentary view in horizontal section illustrating the arrangement of the furnace ports.

Like reference characters refer to like parts in the different figures.

Referring first to Fig. 1, the furnace provides the usual heating chamber 1, at opposite ends of which may be arranged suitable burners 2 and 2' for the delivery of fuel, such as oil, coke oven gas, powdered coal, or the like. The furnace makes provision for the regenerative heating of the air which is used to support the combustion of the fuel supplied by said burners during their alternating periods of operation, said air entering the furnace by way of a centrally disposed port 3 or 3', depending upon which of the burners 2 or 2' is active. The ports 3 and 3' are in communication through passages 4 and 4', respectively, with the air regenerators 5 and 5', the latter, as here shown, being connected to supplementary regenerators 6 and 6'.

In Fig. 1, the burner 2 is shown in an operative condition, and the burner 2' in an inoperative condition; in this situation, as will be well understood, the air for supporting combustion enters by way of the regenerators 5 and 6, and the combustion products, in part, leave the furnace by way of the regenerators 5' and 6'. To reverse the furnace, the burner 2' is made operative and the burner 2 inoperative. Under these conditions, as will hereinafter appear, the air for supporting combustion is caused to enter by way of the regenerators 6' and 5', thereby absorbing a large portion of the heat which said regenerators have extracted from the previous passage therethrough of the outgoing waste gases; under the reversed conditions, said outgoing gases, in part, leave the furnace by way of the port 3 and the regenerators 5 and 6.

Under both conditions of operation as outlined above, only a part of the outgoing waste gases, as stated above, are drawn off through the ports 3 or 3' to the regenerators. Adjacent said ports, at each end of the furnace, are disposed one or more ports 7 and 7', respectively, the latter constituting the termini of passages 8 and 8' that lead the remainder of the outgoing hot waste gases either to a waste heat boiler 9, or to a waste heat boiler 9', depending upon the direction in which the furnace is being operated. The drafting of the furnace and of the associated apparatus above described is effected in the following manner:—

As shown in Fig. 1, the regenerators 5, 6 and 5', 6', at their outer ends remote from the furnace, are connected, respectively, to upwardly opening ducts 10 and 10', each preferably in the form substantially of a Venturi tube. At or near the throat portions of the tubes 10 and 10' are disposed the upwardly-directed air discharge nozzles 11 and 11', respectively, these nozzles being supplied with air from suitably associated blowing devices 12 and 12', preferably arranged exteriorly of the ducts or tubes 10 and 10' and driven by any suitable means, such as individual electric motors, not shown. Substantially in the throat portions of the tubes or ducts 10 and 10' are arranged the valves or dampers 13 and 13', respectively; under the conditions of furnace operation shown in Fig. 1, where the travel of the gases, as shown by the arrows, is from left to right, the damper 13 is substantially closed, thereby directing inwardly to the furnace the air handled by the blower 12, while the damper 13' is open, whereby the exhaust from blower 12', discharging to the atmosphere, is enabled to entrain and to discharge likewise that portion of the waste furnace gases leaving the furnace by way of port 3' and regenerators 5', 6'. When the furnace is reversed, as above described, the damper 13' is closed and the damper 13 is opened, as will be well understood.

According to the invention, inlets for the respective blowing devices 12 and 12' may be constituted by damper-regulated tubular members 14 and 14', each open to the atmosphere at the end thereof remote from the associated blower. These tubular members have connections 15 and 15', respectively, with the outlet or upper ends of the associated waste heat boilers 9 and 9', and in said connections are provided the valves or dampers 16 and 16', respectively. Above said connections to the waste heat boilers, the tubular members 14 and 14' are provided with adjustable dampers 17 and 17', respectively, and also at their open ends these tubular members 14 and 14' are provided with dampers 18 and 18', respectively, each of the latter having an orifice of predetermined size therein, as indicated at 19.

In the operation of the apparatus, with the several dampers positioned as shown in Fig. 1 for travel of the gases from left to right, the air for supporting combustion within the furnace is drawn in by blower 12 through the orifice 19 of the closed damper 18, said air being regulated in amount by the adjustment of the damper 17 in the inlet tube 14; under these conditions, the damper 16 in the connection to the boiler 9 is closed, as shown. Thus the volume of entering air is definitely limited, and an exact control of such volume is afforded by the damper 17, which may be adjusted by the operator for this purpose, to give any desired reading on a pressure gauge 20, of the well known U-type, which is connected with the tube 14 between the dampers 17 and 18. The position of the liquid in this gauge is an accurate measure of the volume of air which is drawn by the blower 12 past the damper 17. Said air, so regulated in volume and accurately measured, is directed into the regenerators 6 and 5 by the closed damper 13, and enters the furnace through the port 3, to support the combustion of the fuel delivered by the burner 2.

The products of such combustion within the furnace divide, in passing out, between the ports 3' and 7' at the other end. Those leaving by the port or ports 7' are drawn by way of passage 8' through the boiler 9', by reason of the fact that the damper 16' in the boiler outlet is open, or partly open, so that the blower 12' is effective on such gases. The latter give up the major portion of their heat in said boiler, for the generation of steam, which may be used in a turbine or the like for driving the blowers 12 and 12', or for any other desired purpose. Said gases, as drawn through the boiler 9', are handled by the blower 12' and discharged upwardly from the nozzles 11' in admixture with air in such amounts as may be desired to admit past the damper 17' of the blower entrance tube 14', in order to reduce the temperature of the gases handled by said blower 12'. Such mixture handled by the blower 12' and discharged upwardly from the nozzle 11' in the tube or duct 10', whose damper 13' for this purpose is open, as shown, serves as a motive fluid to entrain and to discharge to the atmosphere the other portion of the combustion products that leave the furnace by way of port 3' and regenerators 5' and 6'. If the extraction of heat from the gases drawn through the boiler 9' effects a sufficient lowering of their temperature, there will be no need for diluting said gases with air.

In the operation of the furnace as above described, the pressure prevailing in the heating chamber 1 may be indicated by a gauge 21, as shown, and then, when the furnace is reversed by interchanging the positions of the several corresponding dampers or valves, and by rendering the burner 2' operative instead of the burner 2, to give travel of the gases through the system from right to left, the necessary adjustment of said valves or dampers and of the blower speeds may be made by the operator, in order to obtain the same or any other desired pressure conditions within the furnace, as reflected by the position of the liquid in the gauge 21. The air for combustion that enters under these reversed conditions through the tubular member 14' can be accurately measured and regulated in volume by observation of the gauge 20', corresponding to the gauge 20 on the other side of the apparatus. Under these reversed conditions, the waste heat boiler 9, instead of the waste heat boiler 9' receives the heat of the outgoing combustion products.

The furnace may, of course, be operated in either direction without passing any of the hot combustion gases through either waste heat boiler 9 or 9'. Under these conditions, all of the combustion gases will be drawn through the outgoing regenerators 5, 6 or 5', 6', as the case may be,—the motive fluid for the expulsion of such gases being atmospheric air drawn in by the blower through the open damper 18 or 18' and regulated in amount by the damper 17 or 17'; under such conditions, the boiler outlet dampers 16 and 16' would both be closed. Also, if it is desired to generate steam in either or both of the boilers 9 and 9' when the furnace is not in operation, fuel may be supplied to said boilers by the burners 22 and 22', respectively, and the blowers 12 and 12' may be operated as the drafting means for such boilers, to expel the combustion products to the atmosphere, by way of the open ducts 10 and 10'. Under these conditions, if said combustion products are high in temperature, they may be diluted with atmospheric air, drawn in past the dampers 17 and 17' in sufficient quantity to lower the temperature of the mixture to a point that the blower can safely handle.

It is to be noted particularly, in connection with the regenerators 5 and 5', that the entering or hottest ends thereof are remote from the furnace,—the arrangement being such that said ends, which burn out most frequently in operation, are readily accessible through manholes 23, 23', or the like, to permit the repair or replacement of the burned-out checkerwork. The other ends or exits of said regenerators 5 and 5' are disposed by this arrangement adjacent the customary slag pockets, not shown, of the furnace. This is a great advantage over the ordinary arrangement, where the hot end of the regenerator is immediately adjacent the furnace, and where the entire length of the regenerator must be torn out in order to reach the portion thereof that most frequently requires repair or replacement.

Also, of particular advantage in the operation of the furnace is the fact that the outgoing gases, which are expanded to a large volume by the intense heat of combustion, have a correspondingly large outlet area from the chamber 1, by comparison with the area of the air intake for said chamber. That is to say, as shown in Fig. 2, whereas the area of the air intake of the heating chamber is constituted by a single port (3 or 3', as the case may be), on the other hand, the outlet area from said chamber is always constituted by a plurality of ports, i. e., in the present instance, either the ports 3', 7', 7' or the ports 3, 7, 7, depending upon the direction of gaseous flow through the furnace.

I claim,

1. In the operation of a regenerative furnace, the improvement which consists in passing a portion of the combustion products of said furnace through a regenerator, to provide for heating of the air supply to said furnace when the latter is reversed, passing another portion of said combustion products through a waste heat boiler, and causing the entrainment and discharge of said first mentioned portion by said second mentioned portion.

2. In the operation of a regenerative furnace, the improvement which consists in passing a portion of the combustion products of said furnace through a regenerator, to provide for heating of the air supply to said furnace when the latter is reversed, passing another portion of said combustion products through a waste heat boiler, subjecting said second mentioned portion to the discharge action of a blower, and causing the entrainment and discharge of said first portion by the gases exhausted from said blower.

3. In the operation of a regenerative furnace, the improvement which consists in passing a portion of the combustion products of said furnace through a regenerator, to provide for heating of the air supply to said furnace when the latter is reversed, passing another portion of said combustion products through a waste heat boiler, subjecting said second mentioned portion to the discharge action of a blower, admitting air to the blower inlet to cool the gases handled thereby, and causing the entrainment and discharge of said first portion by the gases exhausted from said blower.

4. In apparatus of the class described, the combination with a regenerative furnace, of a waste heat boiler, means for delivering direct to said boiler, without passage through the furnace regenerators, a portion of the combustion products from said furnace, a blowing device adapted to be used alternately for supplying combustion-supporting air to the furnace and for handling said portion of the combustion products, and means for entraining and discharging the other portion of said combustion products by the exhaust from said blowing device, when the latter is handling combustion products.

5. In apparatus of the class described, the combination with a regenerative furnace, of a waste heat boiler, means for delivering direct to said boiler, without passage through the furnace regenerators, a portion of the combustion products from said furnace, a blowing device for handling said portion of the combustion products, means for adding cooling air to the gases handled by said blowing device, and means for entraining and discharging the other portion of said combustion products by the exhaust from said blowing device.

6. The combination with a regenerative heating furnace, of a pair of regenerator passages communicating with said furnace and used alternately in the operation of said furnace as the latter is periodically reversed, for the inflow of combustion-supporting air thereto and for the outflow of a portion of the combustion products therefrom, a pair of waste heat boilers, to one or the other of which, depending on the direction of gaseous flow through the furnace, is delivered another portion of said combustion products, and a pair of blowing devices adapted for use alternately to deliver to said furnace said combustion-supporting air, and to handle the discharge of the second-mentioned portion of the combustion products delivered to one or the other of said waste heat boilers.

7. The combination with a regenerative heating furnace, of a pair of regenerator passages communicating with said furnace and used alternately in the operation of said furnace as the latter is periodically reversed, for the inflow of combustion-supporting air thereto and for the outflow of a portion of the combustion products therefrom, a pair of waste heat boilers, to one or the other of which, depending on the direction of gaseous flow through the furnace, is delivered another portion of said combustion products, a pair of blowing devices adapted for use alternately to deliver to said furnace said combustion-supporting air, and to handle the discharge of the second-mentioned portion of the combustion products delivered to one or the other of said waste heat boilers, and means for entraining and discharging, by the exhaust from the blower which handles said second-mentioned portion of the combustion products, the first-mentioned portion of said products which leave the furnace by way of one or the other of said regenerator passages.

8. The combination with a regenerative heating furnace, of a pair of regenerator passages communicating with said furnace and used alternately in the operation of said furnace as the latter is periodically reversed, for the inflow of combustion-supporting air thereto and for the outflow of a portion of the combustion products therefrom, a pair of waste heat boilers, to one or the other of which, depending on the direction of gaseous flow through the furnace, is delivered another portion of said combustion products, a pair of blowing devices adapted for use alternately to deliver to said furnace said combustion-supporting air, and to handle the discharge of the second-mentioned portion of the combustion products delivered to one or the other of said waste heat boilers, means for admitting cooling air to the inlet of the blower which handles said second-mentioned portion of the combustion products, and means for entraining and discharging, by the exhaust from said blower, the first-mentioned portion of the combustion products that leave the furnace by way of one or the other of said regenerator passages.

9. The combination with a regenerative heating furnace, of a pair of regenerator passages communicating with said furnace and used alternately in the operation of said furnace, as the latter is periodically reversed, for the inflow of combustion-supporting air thereto and for the outflow of a portion of the combustion products therefrom, waste-heat utilizing means to which is delivered another portion of said combustion products, and blowing means associated with said waste-heat utilizing means for handling, in one direction of furnace operation, the discharge of said second-mentioned portion of combustion products, and for supplying, in the other direction of furnace operation, the combustion-supporting air to one of said regenerator passages.

10. The combination with a regenerative heating furnace, of a pair of regenerator passages communicating with said furnace and used alternately in the operation of said furnace, as the latter is periodically reversed, for the inflow of combustion-supporting air thereto and for the outflow of a portion of the combustion products therefrom, waste-heat utilizing means to which is delivered another portion of said combustion products, blowing means associated with said waste-heat utilizing means for handling, in one direction of furnace operation, the discharge of said second-mentioned portion of combustion products, and for supplying, in the other direction of furnace operation, the combustion-supporting air to one of said regenerator passages, and means for entraining and discharging, by the combustion products exhausted from said blowing means, the first-mentioned portion of said combustion products delivered through the other regenerator passage.

11. A regenerative heating furnace having a checkerwork regenerator in communication with its heating chamber, to serve alternately, as the furnace is reversed in operation, for the outflow therefrom of combustion products and for the inflow thereto of combustion-supporting air, the end of said regenerator first contacted by said outflowing combustion products being spaced from said heating chamber by substantially the extension of said regenerator in vertical projection, and the other end of said regenerator which delivers said outflowing combustion products to the stack flue of the furnace being substantially next to said heating chamber, whereby access to the checkerwork at the hotter end of the regenerator, for cleaning and repairs, is obtained without disturbance of the other checkerwork of said regenerator.

12. The combination with a regenerative heating furance, of a pair of regenerator passages communicating with said furnace and used alternately in the operation of said furnace as the latter is periodically reversed, for the inflow of combustion-supporting air thereto and for the outflow of a portion of the combustion products therefrom, a pair of waste heat boilers, to one or the other of which, depending on the direction of gaseous flow through the furnace, is delivered another portion of said combustion products, a pair of blowing devices adapted for use alternately to deliver to said furance said combustion-supporting air, and to handle the discharge of the second-mentioned portion of the combustion products delivered to one or the other of said waste heat boilers, and a pressure gage and damper associated with the inlet of each of said blowing devices, to measure and adjust the amount of air admitted for the support of combustion in the furnace and the amount of air supplied as a motive fluid to entrain the products of combustion.

13. The combination with a regenerative heating furnace, of a pair of regenerator passages communicating with said furnace and used alternately in the operation of said furnace as the latter is periodically reversed, for the inflow of combustion-supporting air thereto and for the outflow of a portion of the combustion products therefrom, a pair of blowing devices adapted for use alternately to deliver to said furnace said combustion-supporting air, and to handle the discharge therefrom of combustion products, an adjustable air-regulating damper in the inlet of each blowing device, a second damper in each inlet providing in its closed position, when the associated blower is used for the delivery of combustion-supporting air, an aperture of predetermined size, and a pressure gauge for each blowing device inlet, communicating therewith between said two dampers, whereby accurate regulation of the air supplied for the support of combustion and of the air supplied as motive fluid for entraining the products of combustion is secured.

14. A regenerative heating furnace having checkerwork regenerator passages at the opposite ends of its heating chamber, said passages serving alternately, as the furnace is reversed in operation, for the outflow therefrom of combustion products and for the inflow thereto of combustion-supporting air, the ends of said regenerator passages first contacted by said outflowing combustion products being spaced from said heating chamber by substantially the extension of said regenerator in vertical projection, and a removable door or plate in each regenerator passage wall at the ends so spaced, to give access to the interior checkerwork at said ends for cleaning and repairs, without disturbance of the other checkerwork of said regenerators.

GEORGE H. ISLEY.